United States Patent [19]

Peltier

[11] 3,869,706

[45] Mar. 4, 1975

[54] SYSTEM FOR CONVERTING TELEVISION SIGNALS INTO ANGLE MODULATED CARRIER WAVEFORMS OF REDUCED BANDWIDTH AND VICE-VERSA

[75] Inventor: Jean Paul Peltier, Paris, France

[73] Assignee: Thomson - CSF, Paris, France

[22] Filed: June 7, 1973

[21] Appl. No.: 368,048

[30] Foreign Application Priority Data

June 13, 1972 France ............................ 72.21163

[52] U.S. Cl.......... 358/12, 178/DIG. 3, 178/DIG. 23

[51] Int. Cl........................... H04n 5/40, H04n 5/44

[58] Field of Search..... 178/5.2 R, DIG. 3, DIG. 23; 179/15 BT; 358/12, 14

[56] References Cited

UNITED STATES PATENTS

| | | | |
|---|---|---|---|
| 2,975,234 | 3/1961 | Le Blan | 178/6 |
| 3,255,303 | 6/1966 | Kihara | 178/5.2 R |
| 3,392,233 | 7/1968 | Houghton | 178/6.6 |
| 3,729,579 | 4/1973 | De Boer | 178/5.4 CD |

*Primary Examiner*—Robert L. Richardson
*Assistant Examiner*—Mitchell Saffian
*Attorney, Agent, or Firm*—Cushman, Darby & Cushman

[57] ABSTRACT

The invention relates to systems for converting television signals into angle modulated waveforms of reduced bandwidth. The conversion consists in splitting the video information into two complementary portions which are distinct frequency bands. The portions are alternatively fed to the modulating input of an angle modulator at a switching rate equal to the line scanning of the television raster. Thus, an interleaved time multiplexed sequence of slices is angle modulated. The reverse operation is performed with two angle demodulating channels, one of which is provided for delaying the incoming waveform by the duration of scanning of a line; the restored video information comprises slices of video information alternately picked up at the outputs of said channels.

18 Claims, 7 Drawing Figures

SYSTEM FOR CONVERTING TELEVISION SIGNALS INTO ANGLE MODULATED CARRIER WAVEFORMS OF REDUCED BANDWIDTH AND VICE-VERSA

The present invention relates in a general way to systems for converting television signals into angle modulated carrier waveforms of reduced bandwidth, and vice-versa. These waveforms are more particularly suitable for recording television signals upon a data carrier such as magnetic tape or video disc.

Hitherto, the development of recording data carriers such as video discs, has been considerably retarded by virtue of the fact that systems for processing television signals give rise to signals which are complex to handle and whose bandwidths are too wide. In other words, the video disc carries a recording of the video signals in the form of points containing the data not in terms of amplitude but in terms of a variable density distribution. In other words, the data is determined by the relative positions of the recorded dots or dashes, this in effect coming down to angle modulation of a carrier waveform. However, it will be clear that the recorded information items cannot be moved unrestrictedly close to one another on a given length of track, and that the resolution thus limits the maximum frequency which can be recorded. Accordingly, the recording has to be made within a frequency band which is limited in the upward sense by this maximum frequency. It will be seen, therefore, that the nature of a point to point recording imposes the technique of recording by angle modulation of the signals concerned. The video disc is then read by means of a pick-up head which produces a pulse each time a point passes, the signal then being angle demodulated to reconstitute the video information.

Despite the fact that already processing systems are being used in which the data pertaining to the video signals are processed in sequential fashion, the methods thus far proposed have not made it possible to stay within the limit determined by the maximum frequency of the frequency band which can be inscribed onto a video disc.

It is clear that the invention is not limited to application to the video disc but can advantageously also be applied wherever there is a requirement to reduce to a maximum possible extent the frequency band required for the processing of television signals, as for example in the case of transmission through a narrow-band channel, recording upon magnetic tape etcetera, etcetera.

A first object of the invention is a method for converting television signals into multiplexed signals constituted by an angle modulated carrier waveform of reduced bandwidth, said method comprising the steps of: splitting said television signals into first and second distinct frequency bands respectively alloted to the transmission of first and second television signal components carrying together the video frequency information contained in said television signals partitioning each of said first and second television signal components into slices in accordance with a sequence of time intervals substantially equal to the line scanning duration of said television signals, selecting without delay half of said slices for forming a time multiplexed sequence of slices wherein a slice of said first television signal component corresponding to a predetermined line in one field is immediately followed by a slice of second television signal component corresponding to the next line in said field, and angle modulating a carrier waveform with said time multiplexed sequence of slices.

The method in accordance with the invention therefore exhibits a special feature in relation to television systems in which the video data is likewise processed sequentially, (N.T.S.C., P.A.L. and S.E.C.A.M. colour systems). However, in these cases, the video data is broken down in such a fashion that the piece representing the luminace is processed in respect of each line of the field.

The invention thus introduces a novel possibility of reducing the bandwidth of the signal being processed, because the luminance signal (which in addition, constitutes the widest portion of the frequency spectrum to be processed) is processed for two consecutive lines of the field in such a manner as to contain information items belonging to said two lines.

In accordance with a particular embodiment of the invention, designed to process monochromatic video data, the method consists in splitting the band spectrum of said portion of the video data representing the luminance, into two frequency ranges and in alternately processing first one and then the other of these frequency ranges, in each case during the respective consecutive scannings of two successive lines of the field.

The two ranges thus processed will, preferentially, be of equal width thus making it possible to achieve a maximum reduction in the overall band spectrum of the video data.

In accordance with another particular embodiment of the invention, designed for the processing of colour video data, the method consists in processing said portion of the video data representing the luminance during the scanning of a first line of said pair and in subsequently processing, during the scanning of the second line of said pair, that portion of the video data which represents the chrominance.

That portion of the video data representing the colour is then, preferentially, constituted by two chrominance signals, which, in a manner known per se, make up, together with the luminance signal, the full video data of the colour image. It is advantageous, especially where the video data is to be processed for the purposes of recording upon a video disc, to subject the signal alternately obtained during two consecutive line scans, to frequency modulation onto a carrier wave.

This modulation can also comprise those portions of the video data which represent the sound and the synchronization.

In accordance with another object of the invention, there is provided a method for restoring television signals from multiplexed signals constituted by an angle modulated carrier waveform of reduced bandwidth, said carrier waveform being modulated by a time multiplexed sequence of slices having a duration equal to the line scanning time of said television signals, and being respectively made of first and second television signal components carrying together the video information; said carrier waveform being further modulated by a line synchronization signal; said method comprising the following steps: feeding said multiplexed signals simultaneously to first and second angle demodulating channels, introducing in one of said channels a signal delay substantially equal to said line scanning time, separating from one another said first and second television signal components at the respective outputs of said first and second angle demodulating channels, alternately transmitting said separated first and second television signal components to a summing network, and selectively transmitting said line synchronization signal taken from one of said outputs for controlling the alternate transmission to said summing network of said separated first and second television signal components.

In accordance with a further object of the invention, there is provided a system for converting television signals into multiplexed signals constituted by an angle modulated carrier waveform of reduced bandwidth, said system comprising: means for splitting said television signals into first and second distinct frequency bands respectively alloted to the transmission of first and second television signal components carrying together the video frequency information pertaining to said television signals; switching means alternately transmitting without delay slices of said first and second television signal components for forming a time multiplexed sequence of slices having each a duration equal to the line scanning time of said television signals; means for angle modulating said carrier waveform with said time multiplexed sequence of slices, and means for further modulating said carrier waveform with a sub-carrier waveform modulated by the line synchronization signal of said television signals; a predetermined slice of said time multiplexed sequence belonging to one of said first and second television signal components and the next slice of said time multiplexed sequence belonging to the other of said first and second television signal components.

In accordance with a still further object of the invention there is provided a system for restoring television signals from multiplexed signals constituted by an angle modulated carrier waveform of reduced bandwidth, said carrier waveform being modulated by a time multiplexed sequence of slices, said slices having a duration equal to the line scanning time of said television signals, and being respectively made of first and second television signal components carrying together the video frequency information pertaining to said television signals; said carrier waveform further carrying a line synchronization signal; said system comprising: first and second angle demodulating channels simultaneously receiving said multiplexed signals, identical frequency demultiplexing means connected at the respective outputs of said first and second angle demodulating channels for selectively transmitting said first and second television signal components, switching means respectively connected at the outputs of said frequency demultiplexing means, summing means fed from said switching means, and selective transmission means connected to one output of said angle demodulating channels for controlling the operation of said switching means in accordance with said line synchronization signal.

For a better understanding of the invention, and to show how the same may be carried into effect, reference will be made to the ensuing description, and the attached figures, among which:

Figure 1:
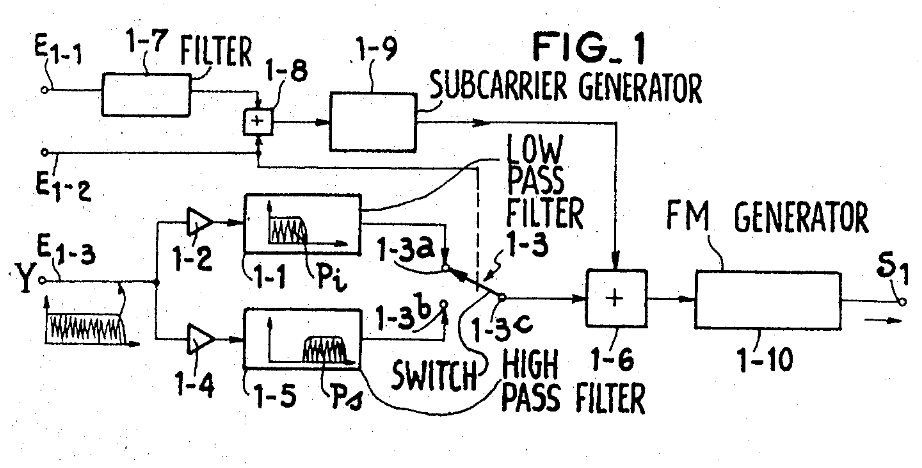
FIG. 1 is a simplified diagram of a system in accordance with the invention for processing monochrome video information.

The diagram of FIG. 1 illustrates a system for converting monochrome television signals into multiplexed signals constituted by an angle modulated carrier waveform of reduced bandwidth. This system has three inputs $E_{1-1}$, $E_{1-2}$ and $E_{1-3}$, which respectively receive a sound signal, a synchronization signal and a luminance signal Y.

The video-information is split into two complementary portions. To this end the input $E_{1-3}$ is connected to a low-pass filter 1-1, across an amplifier 1-2, the filter selecting the bottom range $P_i$ of the spectral band of the luminance signal Y. The output of the filter 1-1 is connected to a first contact 1-3*a* of an electronic switch 1-3.

The input $E_{1-3}$ is also connected, through an amplifier 1-4, to a high-pass filter 1-5 which selects the top range $P_s$ of the spectral band of the luminance signal Y. The output of the filter 1-5 is connected to a second contact 1-3*b* of the electronic switch 1-3. Filters 1-1 and 1-5 thus constitute two transmission channels the frequency ranges $P_i$ and $P_s$ of which will preferably be of equal width although this is by no means essential.

The "moving arm" 1-3*c* of the electronic switch 1-3 is connected to a summing or mixing circuit 1-6. This is controlled by the line synchronization signal coming from the input $E_{1-2}$ of the system.

The summing circuit 1-6 also receives a sub-carrier waveform modulated by the sound signal coming from the input $E_{1-1}$. The latter is connected to a band-pass filter 1-7 whose output is connected to an adder circuit 1-8 to which there is likewise connected the input $E_{1-2}$. The output of the adder circuit 1-8 is connected to a modulator circuit 1-9 whose output is connected to the main adder circuit 1-6. The composite signal coming from the latter is transmitted to a frequency modulator circuit 1-10 which produces an angle modulated carrier waveform at the output $S_1$ of the circuit. This angle modulated waveform constitutes the multiplex signal which can be processed in a variety of ways.

In the case illustrated, where frequency modulation in the circuit 1-10 is carried out, it can in particular be used for recording the video data on a video disc or upon an equivalent recording data carrier such as a magnetic tape. However, the circuit which is to be described, can also be used advantageously for the transmission of video data through a transmission channel having a reduced pass band. It should be noticed that the modulation carried by the multiplex signal is constituted by a time multiplexed sequence of slices having each the duration of a line scan. None of said slices has to be delayed before being picked up by the switch for constructing the modulating sequence.

Figure 2:
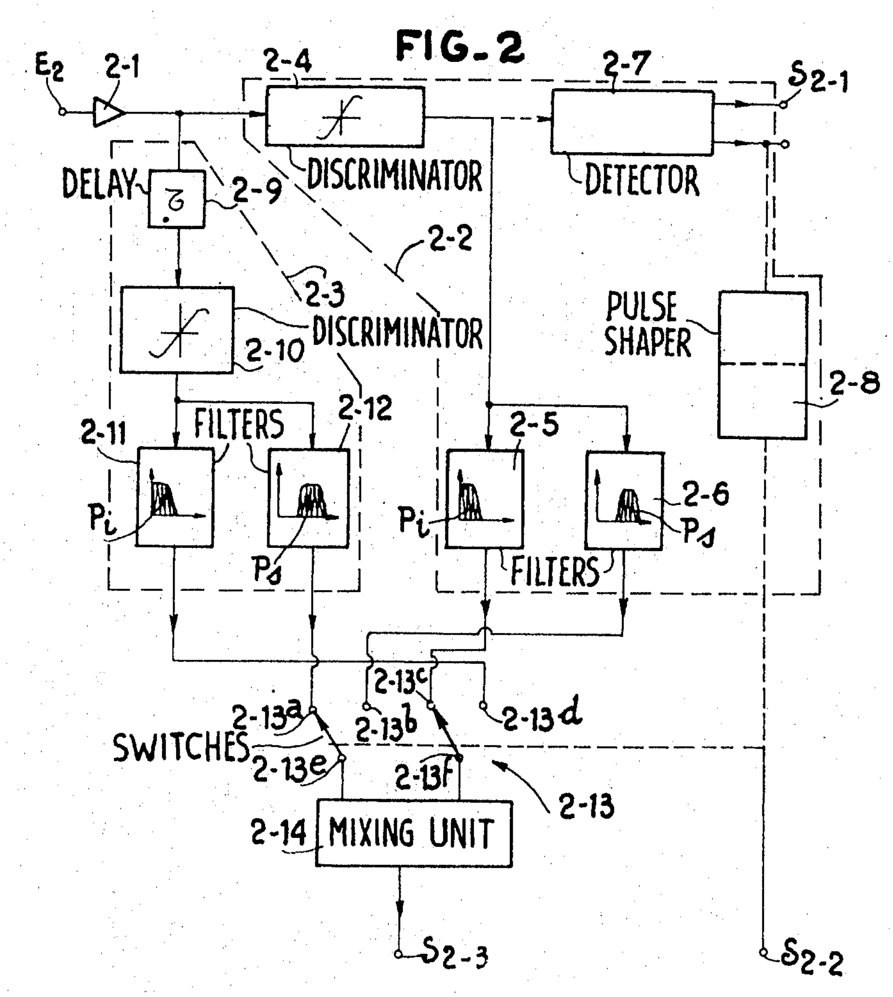
FIG. 2 illustrates a simplified diagram of a system for restoring the monochrome video-information from a multiplex signal as supplied by the system shown in FIG. 1.

The system of FIG. 2 makes it possible to restore television signals from multiplexed signals generated by the conversion system of FIG. 1. Various devices can be connected to it, for example a video disc pick-up or magnetic tape pick-up or, possibly, a narrow-band channel on which the multiplex signals are being transmitted.

The retrieval system will consequently comprise an input $E_2$ to which said multiplex signals are applied. This input is connected to an amplifier 2-1 whose output is simultaneously applied to two transmission channels 2-2 and 2-3. The transmission channel 2-2 contains a frequency discriminator 2-4 which demodulates the multiplex signals.

The output of the discriminator 2-4 is connected to electrical separation means embodying a low-pass filter 2-5 tuned to the bottom range $P_l$ of the frequency band of the luminance signal Y, and a high-pass filter 2-6 tuned to the top range $P_h$.

The frequency discriminator 2-4 is also connected to a demodulator 2-7 which reconstitutes the sound and line synchronization signals. The sound signal appears at a first input $S_{2\text{-}1}$ of the circuit whilst the line synchronization signal passes through a shaping and phasing circuit of the pulse regenerator type 2-8 before being applied to a second output $S_{2\text{-}2}$ of the retrieval system.

The second transmission channel 2-3 contains a delay circuit 2-9 which produces a retardation equal to the line scan time. This circuit is connected to a frequency discriminator 2-10 including traps suppressing the sound and the line synchronization signal; only the two ranges of the luminance signal Y are alternately supplied.

The output of the frequency discriminator 2-10 is connected to a second set of electrical separation means including a low-pass filter 2-11 identical to the filter 2-5, and a high-pass filter 2-12 identical to the filter 2-6.

The four "fixed" contacts 2-13*a*, *b*, *c*, and *d* of an electronic switch 2-13 are respectively connected to the outputs of the filters 2-12, 2-6, 2-5 and 2-11. The contacts 2-13*a* and 2-13*b*, cooperate with a first "moving" contact 2-13*e* which is connected to a summing or mixing circuit 2-14. The other "moving" contact 2-13*f* of the switch 2-13 is also connected to this circuit and cooperates with the "fixed" contacts 2-13*c* and 2-13*d*. The summing circuit, at its output $S_{2\text{-}3}$, produces the reconstituted luminance signal.

The switch 2-13 is controlled by the restored line synchronization signal coming from the pulse regerator circuit 2-8.

The multiplex signal applied to the input $E_2$ of the retrieval system shown in FIG. 2, contains a sequence of data slices alternately pertaining to the high range and the low range, of the luminance signal Y.

Accordingly, the following table can be compiled to illustrate the operation of the system shown in FIG. 2.

TABLE I

| Line | Multiplex Signal | Filters | | | |
|---|---|---|---|---|---|
| | | 2 – 5 | 2 – 6 | 2 – 11 | 2 – 12 |
| $i-2$ | $P_l$ | $P_l$ in (i−2) | — | — | $P_h$ in (i−3) |
| $i-1$ | $P_h$ | — | $P_h$ in (i−1) | $P_l$ in (i−2) | — |
| i | $P_l$ | $P_l$ in i | — | — | $P_h$ in (i−1) |
| $i+1$ | $P_h$ | — | $P_h$ in (i+1) | $P_l$ in i | — |
| $i+2$ | $P_l$ | $P_l$ in (i+2) | — | — | $P_h$ in (i+1) |

The result is that each line of the image field is traced using one of the television signal components of the luminance signal belonging to the considered line, and the other of the television signal components which belongs to the line preceding the line considered. It should be noted that half the video information is lost. However, for the most part, it is found in practice that the variations in luminance from one line to the next are sufficiently small for the image to retain good quality, especially so since it is possible to constitute the image using two interlaced fields in which the slice order are made in reverse orders (see later in the context of restoring a colour multiplex signal).

Referring now more especially to FIGS. 3 to 7 a description will be given of the application of the method of the invention to colour video data.

Figure 3:
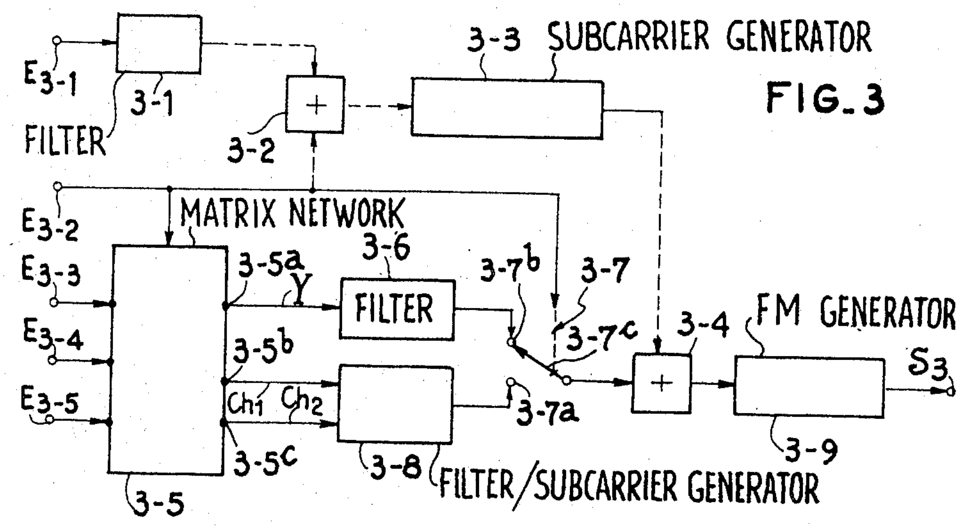
FIG. 3 is a simplified diagram of a system for processing colour video signals.

In FIG. 3, it will be seen that the colour video converting system in accordance with the invention comprises five inputs $E_{3\text{-}1}$ to $E_{3\text{-}5}$ designed respectively to receive the sound signal, the line synchronization signal and the three colour signals G. R and B representing the three primary colours, green, red and blue.

The input $E_{3\text{-}1}$ is connected to a low-pass filter 3-1 which is connected to an adder circuit 3-2 likewise supplied with the line synchronization signal coming from the input $E_{3\text{-}2}$. The adder circuit 3-2 is connected to a circuit 3-3 which modulates a sub-carrier waveform, this circuit itself being connected to an adder circuit 3-4.

The inputs $E_{3\text{-}3}$ to $E_{3\text{-}5}$ are connected to a colour coding matrix 3-5 which, at its outputs 3-5*a*, 3-5*b* and 3-5*c* respectively produces the luminance signal Y and the two chrominance signals $Ch_1$ and $Ch_2$, the three signals being obtained in the conventional manner from the colour signals G, R and B applied to the inputs $E_{3\text{-}3}$ to $E_{3\text{-}5}$.

The output 3-5*a*, is connected to a low-pass filter and delay circuit 3-6 which itself is connected to a first contact, of an electronic switch 3-7 whose moving contact 3-7*c*, is controlled by the line synchronization signal coming from the $E_{3\text{-}2}$. The small delay produced in the circuit 3-6 is designed merely to correct the phase of the luminance signal in relation to that of the chrominance signals.

The outputs 3-5*b* and 3-5*c* of the colour coding matrix 3-5 are connected to a circuit 3-8 which, for insuring frequency multiplexed transmission of the chrominance signals, comprises two subcarrier generators delivering sub-carrier waveforms respectively modulated by the chrominance signals and a summing circuit for superimposing on one another the modulated subcarrier waveforms supplied from said two subcarrier generators. The output of circuit 3-8 is connected to a fixed contact 3-7*a* of the switch 3-7. The contact 3-7*c* is connected to the adder circuit 3-4 which itself is connected to a frequency modulator circuit 3-9 where the data is superimposed upon the main carrier waveform, the output of this circuit constituting the output $S_3$ of the converting system.

Figure 4:
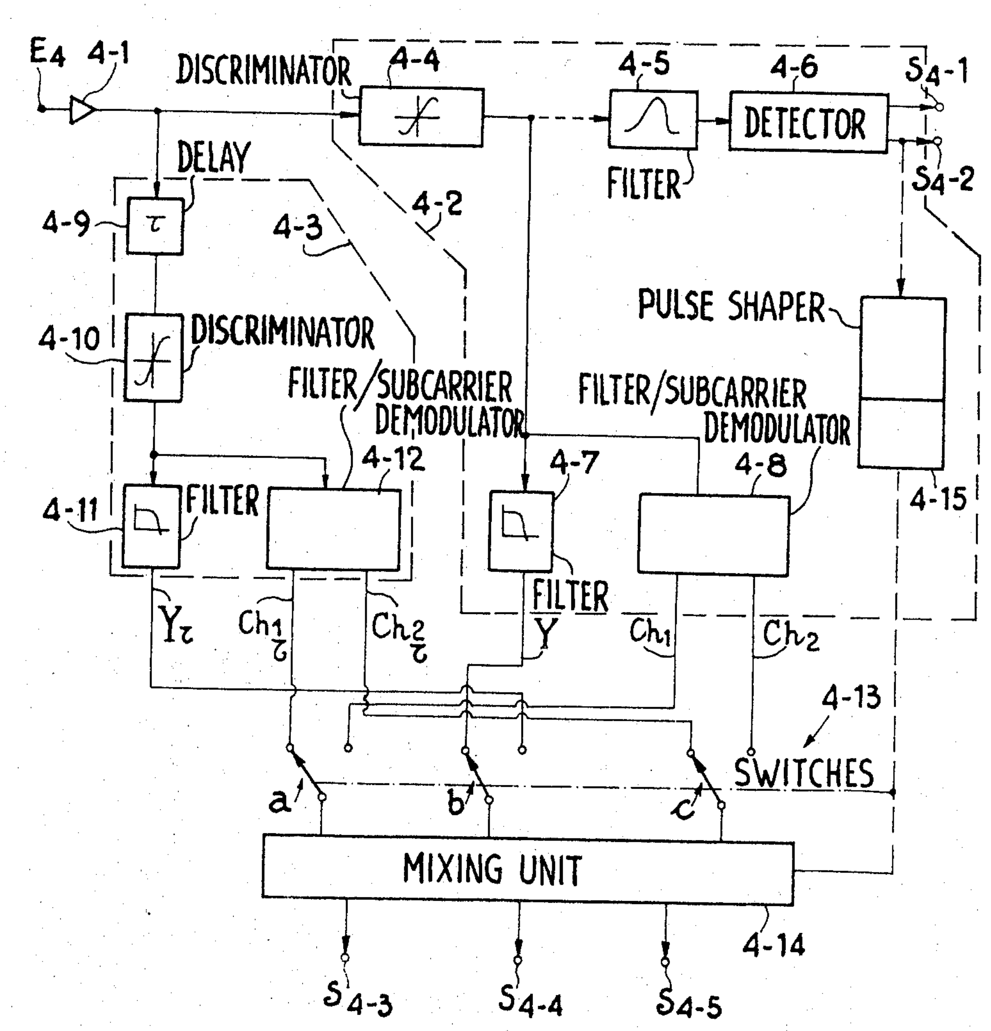
FIG. 4 is a simplified diagram of a system for restoring the colour video signals from a multiplex signal as supplied by the system shown in FIG. 3.

The retrieval system shown in FIG. 4 comprises an input $E_4$ supplied with a colour multiplex signal converted with the help of the system shown in FIG. 3.

This signal is first of all amplified in an amplifier 4-1 for supply to two transmission channels 4-2 and 4-3. The channel 4-2 comprises a frequency discriminator 4-4 which demodulates the main carrier of the multiplex signal. Its output is connected to a low-pass filter 4-5 in order to select the line synchronization signal and the sub-carrier modulated by the sound signals. This sub-carrier being demodulated in a demodulator 4-6 producing the sound signal at the outputs $S_{4\text{-}1}$ and the line synchronization signal appearing at the output $S_{4\text{-}2}$.

The output of the frequency discriminator 4-4 is connected, furthermore, to a low-pass filter 4-7 likewise introducing a small delay, and to a demodulator 4-8 for demodulating the colour sub-carriers.

The transmission channel 4-3 comprises a circuit 4-9 producing a retardation equivalent to the time of line scan. Its output is connected to a frequency discriminator 4-10 in order to demodulate the main carrier of the multiplex signal.

The output of the discriminator 4-10 is connected to a filter 4-11 similar to the filter 4-7, and to a demodulator 4-12 identical to the circuit 4-8.

An electronic switch 4-13 with three inverter *a*, *b* and *c* selectively connects the outputs of the filters 4-7 and 4-11, and of the discriminators 4-8 and 4-12 to a multichannel summing circuit 4-14 which reconstitutes the luminance and chrominance signals, which, if appropriately handled through a matrix network, can represent the three fundamental colours, at the outpus $S_{4\text{-}3}$, $S_{4\text{-}4}$ and $S_{4\text{-}5}$.

The switch 4-13 is controlled by the line synchronization signal coming from the demodulator 4-6, this after said signal has been shaped and phased in a pulse regenerator circuit 4-15. This signal also controls the summing circuit 4-14.

The three sections *a*, *b* and *c* of the switch 4-13 are respectively designed to alternately switch:

the actual luminance signal Y for the delayed luminance signal $Y_t$ ;

the actual chrominance signal $Ch_1$ for the delayed chrominance signal $Ch_{1t}$ ;

the actual chrominance signal $Ch_2$ for the delayed chrominance signal $Ch_{2t}$.

The coded multiplex signal alternately contains luminance data and chrominance data.

The table II illustrates how these data are processed in the system of FIG. 4.

FIG. 4 illustrates the relative location of the lines of the two interlaced fields which constitute the overall television image in the conventional way. In the table, the letters Ch signify the chrominance data comprising the two signals $Ch_1$ and $Ch_2$ combined and produced in the demodulators 4-8 and 4-12. It will be observed, furthermore, that if the line *i* (field I) is traced using luminance information $Y_i$, the line $\bar{i}$ (field II), immediately adjacent the line *i*, is traced using chrominance information $Ch_{\bar{i}}$.

TABLE II

| Field | Line | Multiplex signal | Filter or discriminator 4–7 | 4–8 | 4–11 | 4–12 |
|---|---|---|---|---|---|---|
| | $i-2$ | $Y_{(i-2)}$ | $Y_{(i-2)}$ | — | — | $ch_{(i-3)}$ |
| | $i-1$ | $ch_{(i-1)}$ | — | $ch_{(i-1)}$ | $Y_{(i-2)}$ | — |
| I | $i$ | $Y_i$ | $Y_i$ | — | — | $ch_{(i-1)}$ |
| | $i+1$ | $ch_{(i+1)}$ | — | $ch_{(i+1)}$ | $Y_i$ | — |
| | $i+2$ | $Y_{(i+2)}$ | $Y_{(i+2)}$ | — | — | $ch_{(i+1)}$ |
| | $\bar{i}-2$ | $ch_{(\bar{i}-2)}$ | — | $ch_{(\bar{i}-2)}$ | $Y_{(\bar{i}-3)}$ | — |
| | $\bar{i}-1$ | $Y_{(\bar{i}-1)}$ | $Y_{(\bar{i}-1)}$ | — | — | $ch_{(\bar{i}-2)}$ |
| II | $\bar{i}$ | $ch_{\bar{i}}$ | — | $ch_{\bar{i}}$ | $Y_{(\bar{i}-1)}$ | — |
| | $\bar{i}+1$ | $Y_{(\bar{i}+1)}$ | $Y_{(\bar{i}+1)}$ | — | — | $ch_{\bar{i}}$ |
| | $\bar{i}+2$ | $ch_{(\bar{i}+2)}$ | — | $ch_{(\bar{i}+2)}$ | $Y_{(\bar{i}+1)}$ | — |

Figure 6:
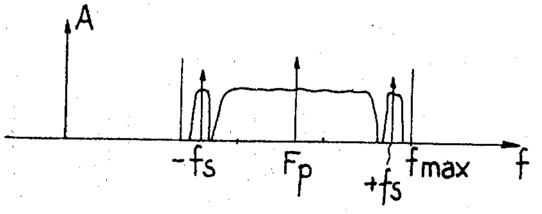
FIG. 6 illustrates a frequency diagram of the signal produced by the system of FIG. 3.
Figure 7:
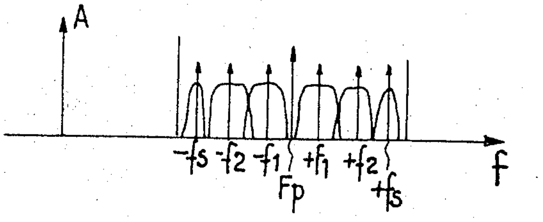
FIG. 7 illustrates a diagram similar to that of FIG. 6.
Figure 5:
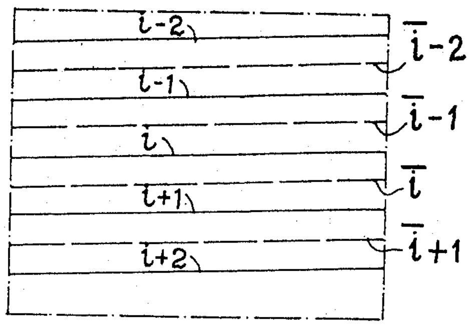
FIG. 5 is a schematic illustration of lines making up the raster of a television image, by which to understand the table given hereinafter.

In FIGS. 6 and 7, diagrams pertaining to the modulation of the main carrier wave $F_p$ for a line *i* of the field (coded and/or decoded luminance data) and a line *i*+1 of said field (coded and/or decoded chrominance data), can be seen.

In these diagrams:

$F_p$ = the frequency of the main carrier, $f_1$ and $f_2$ = frequencies of the two chrominance subcarriers, $f_s$ = frequency of the sound and the syn. sub-carrier, $f_{max}$ = maximum resolving frequency of the recording data carrier or maximum permissible frequency of the transmission channel, A = amplitude.

It will be seen that an independent sub-carrier is utilised for the sound and the line sync. data, in the case illustrated, of spectral or frequency multiplexing. It is equally possible to utilise time-division multiplexing by introducing the sound and sync. signals in place of the image signal, during the field blanking intervals and other methods of modulation could also be utilised in order to form the multiplex signal.

FIGS. 6 and 7 clearly show how the frequency band in which the video signals are processed is exploited in an optimum fashion, the chrominance data being located in the same frequency range as the luminance data due to the particular alternation of the processing of the signals. The result is that the frequency $f_{max}$ can be selected as low as possible.

What I claim is:

1. A method for converting television signals into multiplexed signals constituted by an angle modulated carrier waveform of reduced bandwidth, said method comprising the steps of: splitting said television signals into first and second distinct frequency bands respectively alloted to the transmission of first and second television signal components carrying together the video-frequency information pertaining to said television signals, partitioning each of said first and second television signal components into slices in accordance with a sequence of time intervals substantially equal to the line scanning duration of said television signals, selecting without delay half of said slices for forming a time multiplexed sequence of slices wherein a slice of said first television signal component corresponding to a predetermined line in one field is immediately followed by a slice of said second television signal component corresponding to the next line in said field, and angle modulating a carrier waveform with said time multiplexed sequence of slices; said method, for simultaneously processing the audio frequency information associated with the television image, further comprising the step of continuously modulating said carrier waveform with a further modulated subcarrier waveform carrying said audio-frequency information and the line synchronization signals of said video-frequency information.

2. A method as claimed in claim 1, wherein for converting monochrome television signals, the frequency band of said video-frequency information is split into two adjacent ranges respectively containing the spectra of said first and second television signal components.

3. A method as claimed in claim 2, wherein said adjacent ranges have substantially the same bandwidth.

4. A method as claimed in claim 1, wherein for converting colour television signals, said first and second television signal components are respectively constituted by a luminance signal, and by a composite signal including two frequency multiplexed chrominance signals.

5. A method as claimed in claim 4, wherein said composite signal being obtained by mixing with one another two sub-carrier waveforms respectively modulated by said chrominance signals.

6. A method as claimed in claim 1, wherein the television signals being constituted by two interlaced fields, said multiplexed signals contain a slice of said first television signal component corresponding to a given line in one of said interlaced fields and another slice pertaining to said second television signal component, and corresponding to the next line in the other of said interlaced fields.

7. A method for restoring television signals from multiplexed signals constituted by an angle modulated carrier waveform of reduced bandwidth, said carrier waveform being modulated by a time multiplexed sequence of slices, said slices having a duration equal to the line scanning time of said television signals, and being respectively made of first and second television signal components carrying together the video information ; said carrier waveform being further modulated by a line synchronization signal ; said method comprising the following steps : feeding said multiplexed signals simultaneously to first and second angle demodulating channels, introducing in one of said channels a signal delay substantially equal to said line scanning time, separating from one another said first and second television signal components at the respective outputs of said first and second angle demodulating channels, alternately transmitting said separated first and second television signal components to a summing network, and selectively transmitting said line synchronization signal taken from one of said outputs for controlling the alternate transmission to said summing network of said separated first and second television signal components.

8. A method as claimed in claim 7, wherein the separation from one another of said first and second television signal components is performed by filtering the demodulated carrier waveform in each of said angle demodulating channels.

9. A method as claimed in claim 7, wherein the control of said alternate transmission is performed by selectively picking up the line synchronization signal at the output of one of said angle demodulating channels.

10. A method as claimed in claim 7, wherein an audio-frequency information associated with said video-information is extracted from said multiplexed signal by demodulating at the output of one of said angle demodulating channels, a sub-carrier wave modulated by said audio-frequency information.

11. A method as claimed in claim 7, wherein for colour multiplex signals embodying two chrominance signals, extraction is carried out by demodulating at the output of one of said angle demodulating channels two sub-carrier waveforms respectively modulated by said two chrominance signals.

12. A system for converting television signals into multiplexed signals constituted by an angle modulated carrier waveform of reduced bandwidth, said system comprising: means for splitting said television signals into first and second distinct frequency bands respectively alloted to the transmission of first and second television signal components carrying together the video-frequency information pertaining to said television signals ; switching means alternately transmitting without delay slices of said first and second television signal components for forming a time multiplexed sequence of slices having each a duration equal to the line scanning time of said television signals ; means for angle modulating said carrier waveform with said time multiplexed sequence of slices, and means for further modulating said carrier waveform with a subcarrier waveform modulated by the line synchronization signal of said television signals ; a predetermined slice of said time multiplexed sequence belonging to one of said first and second television signal components and the next slice of said sequence belonging to the other of said first and second television signal components; said system further comprising sub-carrier waveform modulating means having an input for receiving an audio-frequency signal associated with said video-frequency information, and an output feeding the modulating input of said carrier angle modulating means.

13. A system as claimed in claim 12, wherein for processing monochrome video-frequency information, said splitting means comprise a low pass and a high pass filter; the pass bands of said filters being adjacent with one another.

14. A system as claimed in claim 12, wherein for processing colour video-frequency information, said splitting means comprise a filter transmitting the luminance component of said colour video-frequency information, and a pair of sub-carrier modulating means respectively receiving two chrominance components of said colour video-frequency information.

15. A system for restoring television signals from multiplexed signals constituted by an angle modulated carrier waveform of reduced bandwidth, said carrier waveform being modulated by a time multiplexed sequence of slices, said slices having a duration equal to the line scanning time of said television signals, and being respectively made of first and second television signal components carrying together the video-frequency information pertaining to said television signals ; said carrier waveform further carrying a line synchronization signal ; said system comprising : first and second angle demodulating channels simultaneously receiving said multiplexed signals, identical frequency demultiplexing means connected at the respective outputs of said first and second angle demodulating channels for selectively transmitting said first and second television signal components, switching means respectively connected at the outputs of said frequency demultiplexing means, summing means fed from said switching means and selective transmission means connected to one output of said angle demodualting channels for controlling the operation of said switching means in accordance with said line synchronization signals.

16. A system as claimed in claim 15, further comprising means for selectively demodulating a sub-carrier waveform modulated by an audiofrequency information associated with said video-information ; said further demodulating means being connected at the output of one of said angle demodulating channels.

17. A system as claimed in claim 15, wherein for restoring monochrome television signals, said frequency demultiplexing means comprise two identical sets of low-pass and high-pass filters having adjacent pass bands.

18. A system as claimed in claim 15, wherein for restoring colour television signals, said frequency demultiplexing means comprise two identical sets ; each of said sets including a low-pass filter and two sub-carrier waveform demodulator circuits respectively operating in adjacent frequency bands.

* * * * *